Figure 1:
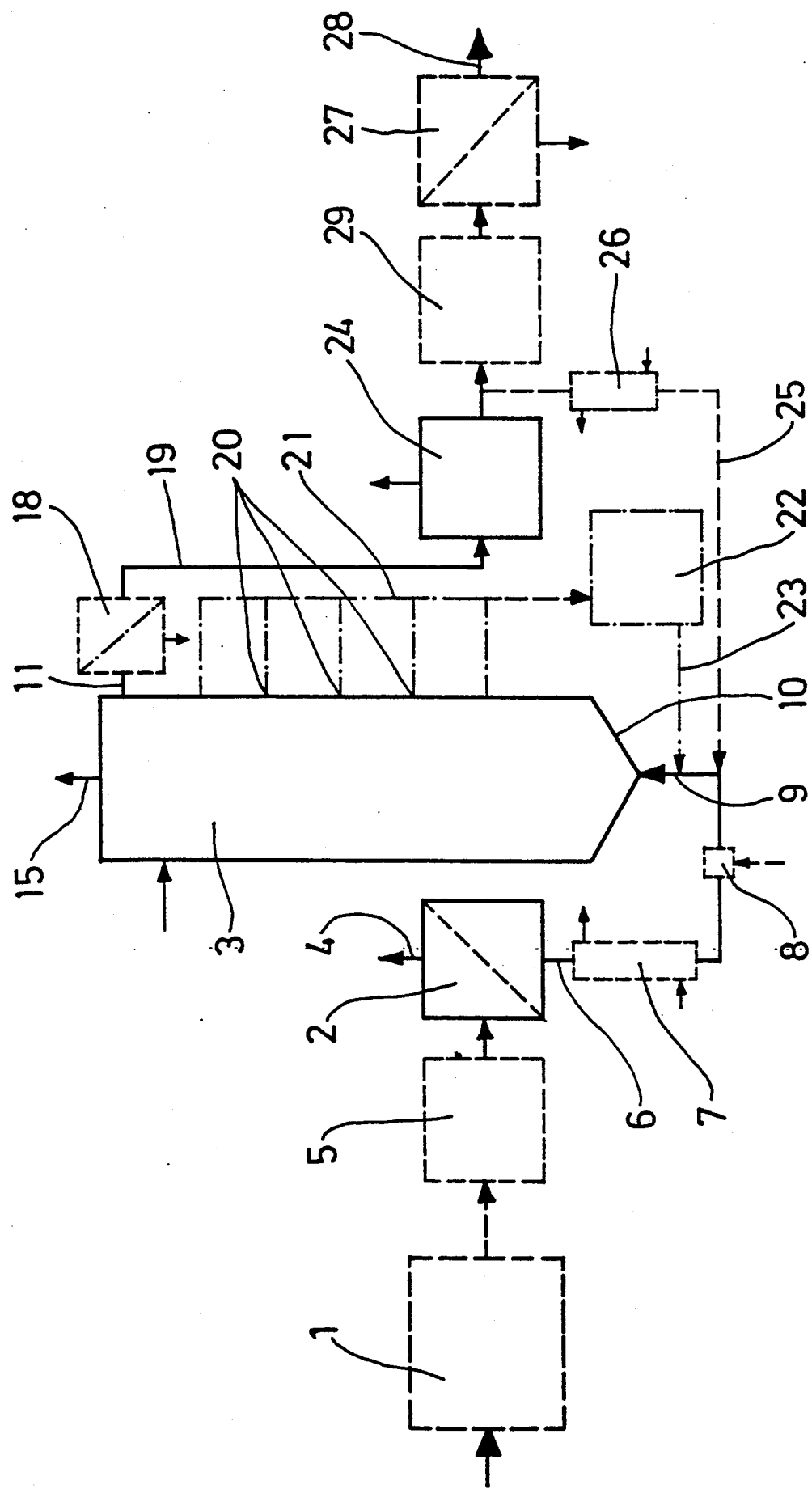

United States Patent [19]

Gresch

[11] Patent Number: 5,014,612
[45] Date of Patent: May 14, 1991

[54] PROCESS FOR THE PRODUCTION OF DEALCOHOLIZED BEVERAGES, AS WELL AS A UNIT AND DEVICE FOR PERFORMING THE PROCESS

[75] Inventor: Walter Gresch, Niederweningen, Switzerland

[73] Assignee: Bucher-Guyer AG Maschinenfabrik, Niederweningen, Switzerland

[21] Appl. No.: 415,317

[22] PCT Filed: Jan. 23, 1989

[86] PCT No.: PCT/CH89/00012
§ 371 Date: Aug. 18, 1989
§ 102(e) Date: Aug. 18, 1989

[87] PCT Pub. No.: WO89/07132
PCT Pub. Date: Aug. 10, 1989

[30] Foreign Application Priority Data

Jan. 27, 1988 [CH] Switzerland ............... 284/88

[51] Int. Cl.⁵ .............................. C12M 1/36
[52] U.S. Cl. ........................ 99/276; 99/277.2
[58] Field of Search ............ 99/275, 276, 277, 277.1, 99/277.2, 278; 426/592, 599, 11, 12, 13, 14; 210/260, 319, 738

[56] References Cited

U.S. PATENT DOCUMENTS

| 4,002,111 | 1/1977 | Pujol | 99/276 |
| 4,856,421 | 8/1989 | Whitford | 99/276 |
| 4,891,236 | 1/1990 | Ohta | 426/599 |
| 4,952,503 | 8/1990 | Granstedt | 426/14 |

Primary Examiner—Robert W. Jenkins
Attorney, Agent, or Firm—Edmund M. Jaskiewicz

[57] ABSTRACT

For continuous production of dealcoholized beverages, a substrate consisting of fruit or berry juice, grape juice or beer wort is first preclarified in a microfiltration device (2) and sterilized and then fermented by immobilized microorganisms in the fluid bed process in a tower fermenter (3). Support particles (12), which are kept in suspension in tower fermenter (3) and to which the microorganisms are bonded, guarantee an effective biomass retention. After fermentation in tower fermenter (3), the raw juice is freed of alcohol in a dealcoholization device (24) and then clarified in an ultrafiltration or microfiltration device (27). The process taking place in a continuous product line makes possible an especially economical and productive operation of the unit.

3 Claims, 3 Drawing Sheets

PROCESS FOR THE PRODUCTION OF DEALCOHOLIZED BEVERAGES, AS WELL AS A UNIT AND DEVICE FOR PERFORMING THE PROCESS

This invention relates to a process for producing dealcoholized beverages by fermentation and dealcoholization of a substrate consisting of fruit or berry juice, grape juice or beer wort.

In dealcoholized beverages, a differentation is made between alcohol-free (alcohol content 0.5%), low-alcohol (1.5%) and reduced alcohol beverages (1.5%). Here, the characteristic flavoring materials of the corresponding alcoholic beverage, for example wine or beer, are to be maintained as unchanged as possible in the dealcoholized beverage.

To produce dealcoholized wine it is known to again remove subsequently the alcohol by various dealcoholization processes from alcoholic wine stemming from normal production. Here, fermentation processes are used for the production of the alcoholic wine practically all of which take place batchwise and in which the alcohol is produced by fermentation.

The same also applies to the production of alcohol-free beer. The alcohol produced during the normal production by fermentation is subsequently again completely or partially removed from the beer. To reduce the alcohol content of the beer already during production, here the fermentation process can be interrupted and the beer can be prematurely removed from the fermentation tank, the so-called fermenter.

Processes are also already known in which, to produce dealcoholized beverages, the substrate is subjected to the action of microorganisms so that, during fermentation, only little or no alcohol at all is produced. According to EP-OS No. 0213220, for this purpose the microorganisms, for example yeast, are fixed to a special support material. The support material, which can consist of diatomaceous earth, is located in a reactor designed as a diatomaceous earth filter into which the substrate is introduced. Here a fixed bed process is involved in which the substrate is pumped through the diatomaceous earth filter. But in doing so the danger arises that the filter becomes clogged after a certain time and thus a continuous operation becomes difficult. Further, beer dealcoholized this way does not achieve the quality of beer that is subsequently dealcoholized.

The same applies also to another known process for producing dealcoholized beer. Here, during fermentation, microorganisms are used that do not ferment any maltose. This means that the sugar contained in the maltose is not converted into alcohol and thus the end product exhibits less alcohol.

From GB-PS No. 1406506 it is further known, to accelerate fermentation during the production of alcoholic beverages, to convey the substrate under pressure through a retention filter on which the microorganisms are placed in fixed position. Here the fermentation can be influenced by changing the pressure and temperature conditions. To obtain an alcohol-free beverage, the alcohol must subsequently be again removed from the beverage produced this way.

The known fermentation processes for producing wine or beer practically all take place batchwise. During the production of wine, the fermentation generally lasts 3 to 6 weeks. During this time, the fermentation process must constantly be monitored. The labor costs for the long, batchwise processing, which can be automated only with difficulty, are correspondingly high. High investment costs arise for the tank capacity and the costs of earmarking capital because of the long time between raw material purchase and sale of the product. Further, the division into conventional wine production and subsequent dealcoholization makes the end product more expensive, additionally in part by higher raw material costs, additional storage costs and higher labor costs. Also with respect to production quality, special needs of the subsequently produced dealcoholized beverage cannot be considered in the known processes. A similar situation exists also to a lesser degree in the known processes for producing dealcoholized beer.

Therefore, the object of the invention is to provide a process of the type mentioned initially that avoids the cited drawbacks and makes possible the economical production of a dealcoholized, qualitatively good beverage with relatively short process duration and low production costs.

According to the invention, this object is achieved in that the substrate is freed from possible harmful effects of microorganisms in a continuous product line first by physical treatment and then is at least partially fermented by beverage-compatible microorganisms and at least partial biomass retention, then it is at least partially dealcoholized continuously or semicontinuously and next fed to further processing.

Other advantageous and suitable embodiments of the invention can be seen in the claims.

The advantages achieved with the invention consist especially in that an extremely economical operation is made possible by the continuous product line of fermentation and dealcoholization as well as by the continuous running of these processing steps. The biomass retention during the fermentation considerably simplifies the subsequent dealcoholization that is integrated in the overall unit, because the fermentation product is cleaner, i.e., less loaded or not loaded at all with biomass. Since the biomass retention increases the concentration of the biomass in the reactor, the productivity of the unit is also increased. The increased concentration of microorganisms in the reactor is, moreover, the prerequisite for a continuous and thus economical operation of the unit.

Figure 2:
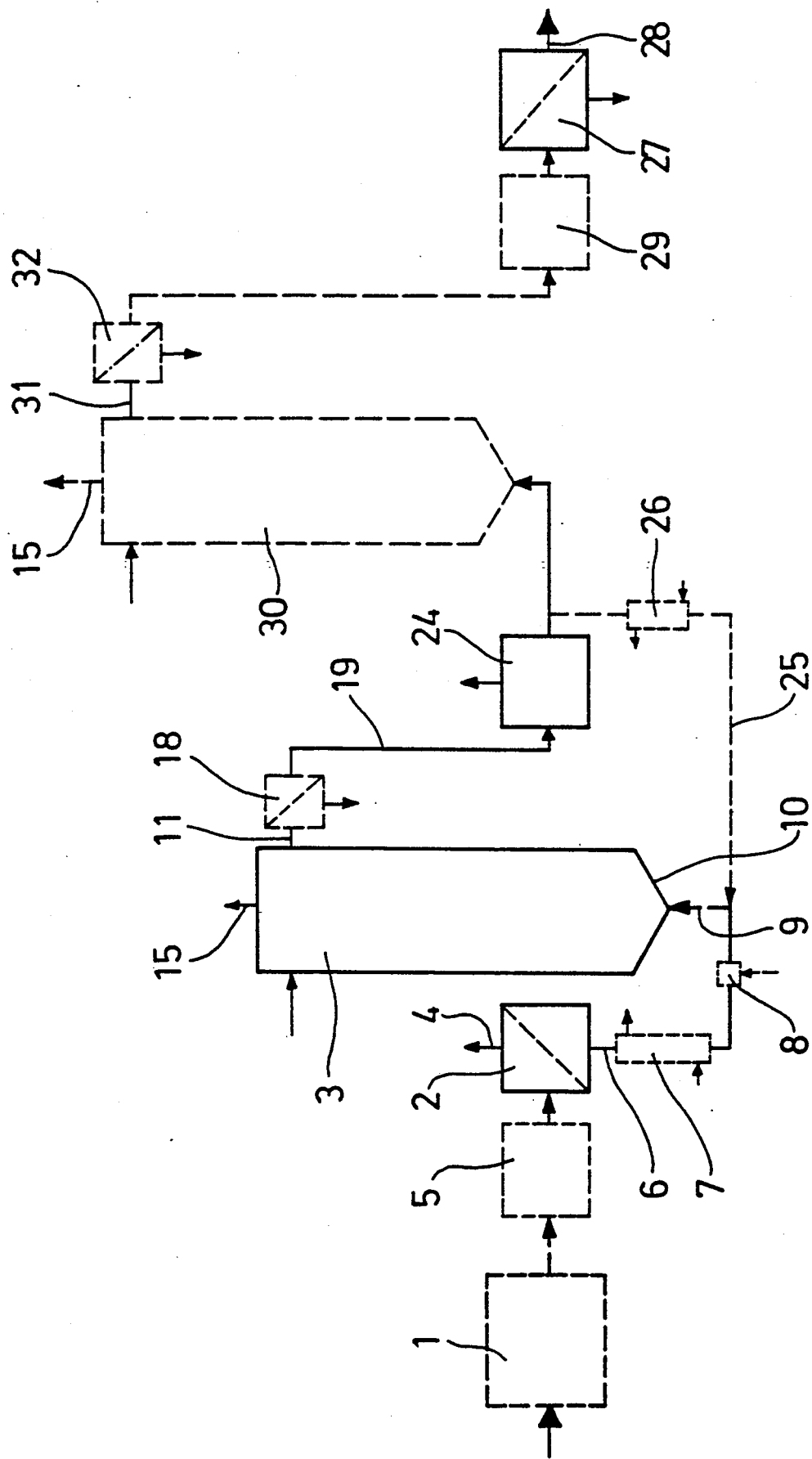
Figure 3:
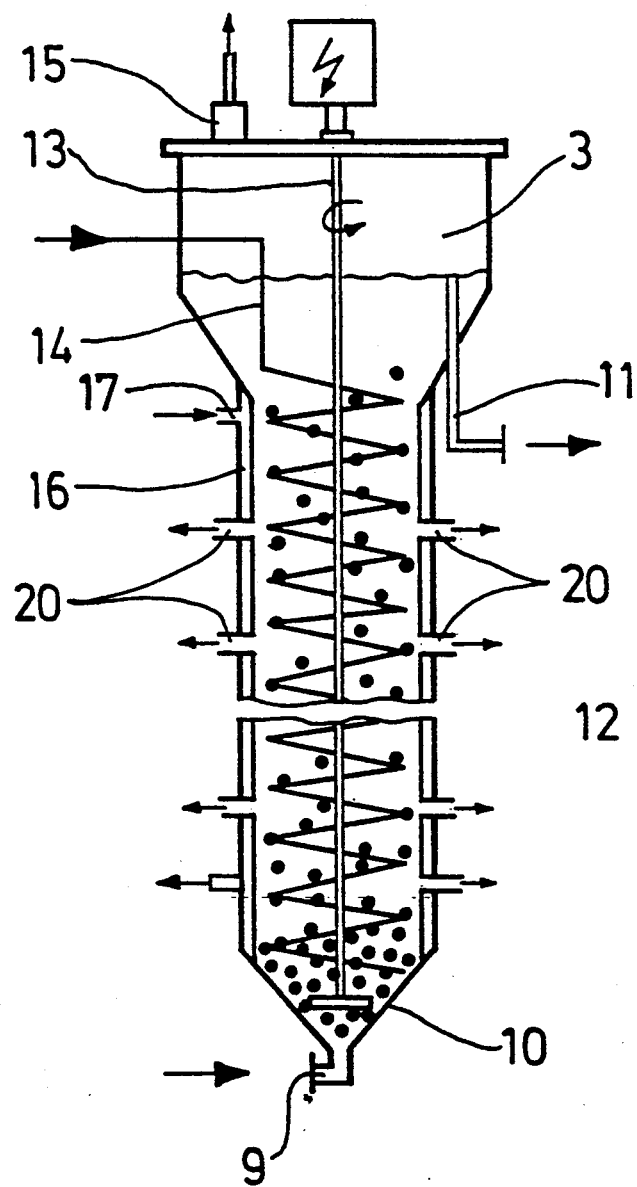

The invention is described in more detail in the following description and drawing, which shows two embodiments. There are shown in:

FIG. 1, a diagrammatic representation of the unit according to the invention,

FIG. 2, a diagrammatic representation of an expanded embodiment of the unit according to FIG. 1, and FIG. 3, a lengthwise section through the tower fermenter according to the unit according to FIGS. 1 and 2.

The raw material consisting of fruit, grapes, berries or malt and hops is processed in a preparation step 1 into a substrate of grape juice, fruit juice, berry juice or beer wort. The substrate can be obtained by conventional methods, e.g., by using pressing or also by liquefaction technologies. The substrate, from which the dealcoholized wine or the dealcoholized beer is later obtained, contains a multiplicity of harmful microorganisms and settlings that must be made harmless or be removed before the fermentation process. The preclarification and sterilization of the substrate is performed continuously in a microfiltration device 2 that is placed between preparation step 1 and a tower fermenter 3 in which the fermentation process occurs. The retentate of microfiltration device 2, which contains harmful microorganisms and settlings, is drawn off by a pipe 4 from the unit operating continuously in a continuous product line. In this way, a clean substrate is obtained that leads to a trouble-free operation of the subsequent, continuous fermentation and also to an improvement in quality of the end product. The short retention times for clarification and sterilization of the substrate in microfiltration device 2 and the continuous passage promote making the overall production process more efficient. Further, the cold process of microfiltration avoids the harmful heat stress on the substrate that occurs with the usual sterilization by heating.

In certain cases, it is suitable to place a pretreatment step 5 in front of microfiltration device 2. Therefore, e.g., in pretreatment step 5, a heat treatment, for example by high-temperature-short time pasteurization is perfomed to obtain color for red wine. To increase the fermenter productivity, a prefermentation of the substrate in pretreatment step 5 can also be performed. The prefermentation can also be performed upstream from preparation device 1 by pressing to obtain color and tannin in red wine. Another advantageous possibility for action on the substrate before the fermentation process is available by a glucose-oxidase treatment in pretreatment step 5. Here, the glucose contained in the substrate is converted into acid by a known process. The result of this is less sugar in the substrate so that, during the subsequent fermentation, also less alcohol is produced and productivity during the production of dealcoholized beverages is increased. Moreover, the glucose-oxidase treatment in many cases also means an improvement in quality of the end product. In pretreatment step 5, still other treatment processes can be performed to improve the quality of the end product with respect to flavor, smell, color, etc. To improve the economic efficiency, all treatments in pretreatment step 5 are performed in a continuously running process.

After the substrate has passed through pretreatment step 5 and has been preclarified and sterilized in microfiltration device 2, it is fed to tower fermenter 3 by pipe 6. A heat exchanger 7 that is used to heat up or cool off the substrate to the fermentation temperture is provided in pipe 6. Before the substrate is introduced into tower fermenter 3 at its underside, an acid breakdown can be performed in the substrate in a continuous mixer 8 by mixing in potassium or calcium carbonate. Since the addition is performed between microfiltration device 2 and tower fermenter 3, pore clogs in microfiltration device 2 are prevented. Such an acid breakdown is sometimes necessary to increase somewhat, for fermentation, the pH in tower fermenter 3 in view of the use of certain microorganisms, e.g., *Zymomonas mobilis*.

The substrate is continuously fed to tower fermenter 3 by a pipe 9 at its underside 10 (FIG. 3). While the substrate passes through tower fermenter 3 from bottom to top, it is fermented and continuously drawn off at the top side by a pipe 11 as an alcoholic beverage, e.g., wine or beer. The fermentation in tower fermenter 3 is performed by microorganisms that are kept in suspension in the substrate and cause the fermentation process. Here, beverage-compatible microorganisms are involved that are permitted by law and do not produce by-products that are toxic or impair taste and smell. The microorganisms form a multiplying biomass that is nourished by the substrate and reacts with the latter. Here, in addition to alcohol, high value, desired flavor and flavoring substances are also produced.

The microorganisms are settled in tower fermenter 3 preferably on inert support material, i.e., it is not capable of reacting chemically under these conditions. The support material consists of a coke, sand, polymer or other support particles 12 that are selected large enough so that they are kept in suspension in tower fermenter 3 by the substrate flowing through and thus neither sink downward nor rise upward. The immobilized cells found on support particles 12 and kept in suspension according to the fluid bed process cannot be drawn off in this way with the fermentation product (wine, beer) and thus remain in tower fermenter 3. This results in an efficient biomass retention by which the expense for the especially expensive device for recycling the biomass can be avoided.

The substrate mixed in tower fermenter 3 with the biomass is kept constantly in motion by an agitator 13. A silicone tubing 14 inserted into tower fermenter 3 takes care of a bubble-free aeration of the fermenter contents. The supply of sterile air is necessary mainly at the beginning for the cell growth of the microorganisms and to a limited extent during the operation to replace dead cells. The bubble-free aeration has the advantage that little oxygen excess and thus less flavor loss occurs and no foam is formed. During fermentation, alcohol and $CO_2$ are produced as main fermentation products. The resulting $CO_2$ pressure can also be used to control the fermentation. In tower fermenter 3 there prevails, during fermentation, an excess pressure of about 0.5 to 6 bars. Excess $CO_2$ and $O_2$ are discharged on top in tower fermenter 3 by a discharge opening 15. The $CO_2$ is important for the resulting wine, which is more sparkling with higher $CO_2$ content and less sparkling with lower $CO_2$ content. Tower fermenter 3 further has a cooling jacket 16 into which a coolant is introduced through a feed opening 17. The cooling of tower fermenter 3 is used to draw off reaction heat developing during fermentation.

The fluid bed process by immobilized microorganisms according to FIG. 3 makes possible extremely short retention times of, e.g., 1 to 4 hours. The improved material exchange increases the productivity of the fermenter. While with conventional fermentation of wine natural settling is necessary as a support of microorganisms so that the fermentation gets a good start, the support function of the settlings in the substrate according to the invention that is preclarified and freed of harmful microorganisms is assumed by support particles 12 provided with beverage-compatible microorganisms. As a result of the placement of microorganisms on artificial supports, dead cells detach themselves automatically from support particles 12 and thus can be easily discharged from tower fermenter 3.

To remove free and/or dead cells from the fermented substrate, a microfiltration device 18 is connected downstream from tower fermenter 3 (FIG. 1). Alcoholic beverage drawn off there by pipe 11 is introduced into the retentate side of microfiltration device 18 and leaves the permeate side by a pipe 19 in the purified state. The free and dead cells, as well as possibly other residues, are drawn off with the retentate. To discharge whole support particles 12 from fermenter 3, several discharge openings 20 are placed in wall 16 of tower fermenter 3. Discharged support particles 12 are fed by a collecting main 21 to a regeneration step 22 in which support particles 12 under sterile conditions are freed of microorganisms and/or are restored and are recycled by a pipe 23 again into tower fermenter 3.

By discharging free and/or dead cells or whole support particles 12, the occurrence of an undesired aftertaste in the beverage is prevented and thus the quality of the end product is improved. Further, the productivity of the fermenter is maintained by the removal of the dead cells. Free cells can also reduce the performance of subsequent dealcoholization. The devices for dealcoholization can, for this reason, be built smaller and more economically if the free cells are not fed to the dealcoholization together with the fermented substrate.

As a rule, it suffices to discharge microorganisms from tower fermenter 3 by microfiltration device 18. The discharging of whole support particles 12 is necessary only in certain cases. But the use of both processes can take place individually or in combination and is not limited to this embodiment, but rather can also be used advantageously for other purposes of biotechnology.

The fermentation of the substrate can be accelerated in that microorganisms bonded to support particles 12 consist of bacteria instead of yeast. With bacteria, the alcohol production can be increased two to threefold. This applies especially for the use of bacteria of the strain *Zymomonas mobilis*. Preferably, these bacteria are used for the production of so-called "cooler" beverages, in which the flavor does not necessarily have to correspond to that of alcoholic wine. Another flavor, caused by the use of bacteria instead of yeast, is not disturbing in this case since the lower production costs are more important. But in various countries a permit for this or a similar type of bacteria is still to be obtained.

The volumetric productivity of tower fermenter 3 can be increased even more in certain cases, e.g., with *Zymomonas mobilis* if, in addition to the microorganisms, fermentation-promoting enzymes are also bonded to support particles 12 by coimmobilization. Also, e.g., the glucose-oxidase treatment performed in pretreatment step 5 before the fermentation can be performed advantageously also directly in tower fermenter 3. For this purpose, glucose-oxidase enzymes are additionally bonded to the microorganisms on support particles 12 and brought into tower fermenter 3. The oxygen necessary for the reaction is fed from the outside through silicone tubing 14 and is distributed without bubbles in tower fermenter 3. Since, as a result of the glucose-oxidase reaction during fermentation, less alcohol is produced, also less alcohol needs to be drawn off during the dealcoholization. This leads to an improvement of the quality of the end product. The productivity is increased, since the glucose-oxidase reaction runs more rapidly than fermentation. Further, the equipment expense is less compared to treatment step 5. But the treatment by glucose-oxidase enzymes bonded to the support in tower fermenter 3 can also be performed in combination with pretreatment step 5.

Instead of support-bonded immobilization, the immobilization of the cells is also possible by forming agglomerates, i.e., without supports. Further, the process according to the invention can be performed also with a fixed bed reactor.

After the fermented substrate has left, in the form of slightly alcoholic raw juice, tower fermenter 3 and microfiltration device 18, it is fed by pipe 19 to a dealcoholization device 24. In dealcoholization device 24 the alcohol is completely or partially removed from the raw juice. This occurs preferably by membrane processes such as, e.g., reverse osmosis, dialysis and others that have the advantage, compared to conventional, thermal processes, that in doing so no heat treatment is performed and thus a qualitative improvement is provided in connection with a subsequent, cold, further processing. It is also advantageous that with the membrane process the $CO_2$ generated during the fermentation remains to a large extent in the juice. During the recycling of the dealcoholized raw juice in tower fermenter 3, as explained in the following section, there results, compared to thermal processes in which a cooling of the dealcoholized beverage to the fermenter inlet temperature is absolutely necessary, another advantage by the associated energy saving.

As can be seen from FIGS. 1 and 2, the dealcoholized raw juice is recycled again, after leaving dealcoholization device 24, into tower fermenter 3 by a pipe 25 that empties into pipe 9. In pipe 9 there is placed a cooler 26 that is used to bring the recycled raw juice to the fermentation temperature. Since the recycled raw juice, already fermented and dealcoholized, mixes with the still unfermented substrate, the alcohol concentration in fermenter 3 can be reduced to, e.g., 5–9%, 11–12% by volume by weight with wine. The result of this is that tower fermenter 3 can operate at higher temperatures, e.g., 30 instead of 20° C. Preferably, the maximum temperature in the fermenter is above 25° C. This results in higher productivity as a result of shorter retention times and a simpler temperature control. On the other hand, a better quality is achieved with respect to taste and flavor if no use is made of the possibility of increasing temperature.

With the recycling, concentrated substrates, i.e., substrates with an increased sugar content, can also be fermented. This leads in particular with fruit wine to improvements in quality. In addition, a reduction of the fermenter volume and thus cost savings are also possible in part. The recycling of the dealcoholized raw juice in tower fermenter 3 and the associated advantages are made possible first of all because the unit is designed according to the invention as a continuous product line. By controlling and recycling, the alcohol concentration in the fermenter can be adjusted to a preferred range of 40–80% of the alcohol concentration without raw juice recycling.

After the dealcoholization of the raw juice in dealcoholization device 24, as a further processing step the clarification of the raw juice is performed preferably in a microfiltration or ultrafiltration device 27. The dealcoholized and clarified raw juice is drawn off by a pipe 28 as a finished, low-alcohol or alcohol-free beverage. The cold treatment of the raw juice that occurs in microfiltration or ultrafiltration device 27 and that takes place as a continuous or semicontinuous process in a temperature range of about 18° to 55° C., has a favorable effect on the quality of the end product. A pretreatment of the raw juice is generally not necessary, or necessary only to a limited extent, with this clarification process.

As a further processing step after dealcoholization, a post-treatment step 29 can be provided between dealcoholization device 24 and microfiltration or ultrafiltration device 27. In post-treatment step 29 the raw juice is subjected in a known way to a prefining before clarification. Post-treatment step 29 can be used also to break down acid, to remove tartar, for acidification, etc.

In the embodiment according to FIG. 2, in the framework of further processing after the dealcoholization another fermentation step is provided in the form of a second tower fermenter 30 that is connected to dealcoholization device 24. In this case, in first tower fermenter 3 only partial fermentation is performed. At outlet 31 of tower fermenter 30 there is provided, as in the embodiment according to FIG. 1, a microfiltration device 32 to discharge free or dead microorganisms. After this, the alcohol-reduced raw juice is fed to post-treatment step 29 and ultrafiltration or microfiltration device 27 for clarification. The use of a second fermenter serves above all to produce qualitatively improved beverages that are only alcohol-reduced. Second tower fermenter 30 can be identical in its structure to first tower fermenter 3. But it is also conceivable that fermenter 30 operates according to standard processes.

This process according to the invention is especially suited for the production of dealcoholized "cheap wine" or "coolers," i.e., beverages adulterated with fruit juice that contain little alcohol, are low in calories and generally are not or only slightly sweet. These beverages produced according to the process according to the invention are, compared to alcoholic beverages, considerably cheaper and thus able to compete pricewise with the standard, alcohol-free beverages. But the process according to the invention can also be used for the production of certain dealcoholized beers.

I claim:

1. In an apparatus for the production of dealcoholized beverages by fermentation and dealcoholization of a substrate consisting of fruit or berry juices, grape juice or beer wort, comprising microfiltration means receiving a substrate for continuous clarification and sterilization of the substrate to form a clear substrate, a tower fermenter having a fluid bed therein and connected to said microfiltration means to receive said clear substrate therefrom, said clear substrate flowing through said tower fermenter, said tower fermenter containing inert support particles, and means within said tower fermenter for maintaining the substrate mixed in said tower fermenter in constant motion.

2. In an apparatus according to claim 1 wherein wall (16) of tower fermenter (3, 30) there are placed several discharge openings (20) through which support particles (12) are discharged.

3. In an apparatus according to claim 2 wherein the oxygen necessary for the cell growth and the enzymatic glucose breakdown is fed from the outside into tower fermenter (3, 30) and is distributed without bubbles with the aid of an air-permeable, finely porous hollow body, pipe or tubing (14) in the fermenter.

* * * * *